United States Patent [19]

Howson

[11] Patent Number: 4,765,776
[45] Date of Patent: Aug. 23, 1988

[54] CONVERTIBLE BARGE

[75] Inventor: Robert E. Howson, New Orleans, La.

[73] Assignee: McDermott Incorporated, New Orleans, La.

[21] Appl. No.: 931,283

[22] Filed: Nov. 17, 1986

[51] Int. Cl.$^4$ .................. B63B 35/02; F16L 1/04
[52] U.S. Cl. .................. 405/169; 405/168; 405/166; 405/158; 29/430; 414/747
[58] Field of Search .......... 405/168, 169, 170, 166, 405/174, 175; 414/745, 746, 747; 228/17.5, 17.7, 147, 151; 29/429, 430

[56] References Cited

U.S. PATENT DOCUMENTS

| | | | |
|---|---|---|---|
| 3,372,461 | 3/1968 | Tesson | 405/168 X |
| 3,373,586 | 3/1968 | Sengel | 228/17.7 X |
| 3,900,146 | 8/1975 | Fowler | 29/429 X |
| 4,260,287 | 4/1981 | Uyeda et al. | 405/168 |
| 4,591,294 | 5/1986 | Foulkes | 405/169 X |
| 4,651,914 | 3/1987 | Sprung et al. | 228/7 |

FOREIGN PATENT DOCUMENTS 2545545  4/1976  Fed. Rep. of Germany ...... 405/166

Primary Examiner—Randolph A. Reese
Assistant Examiner—John A. Ricci
Attorney, Agent, or Firm—Robert J. Edwards; D. Neil LaHaye

[57] ABSTRACT

A convertible barge having self-contained modules positioned thereon containing pipeline processing equipment. The modules are removably attached to the deck of the barge and are provided with a closable opening on at least one end thereof for passing a pipeline portion therethrough to another module. Spacer modules may be positioned between the modules housing processing equipment so that modules of standardized dimensions may be used.

18 Claims, 4 Drawing Sheets

CONVERTIBLE BARGE

BACKGROUND OF THE INVENTION

The present invention relates to the laying of pipeline from a barge.

When oil and gas wells are drilled and exploited at sea, underwater pipelines are generally used for transporting the gas and oil from the offshore wells or production sites to near-shore or on-shore terminals for storage and/or ultimate delivery of the gas or oil to refineries and then to the consumer. Large numbers of pipelines have been laid offshore along the sea bottom by conventional pipe laying barges to connect the production sites with the near-shore or on-shore facilities. Such conventional barges are usually characterized by a single standard barge hull which is generally rectangular in shape with a bow at the front and operates in surface floating condition with a pipe section assembly line normally disposed along the hull's top side and permanently attached thereto for welding the pipe sections one to the other. As the pipe sections are welded one to the other, the resulting pipeline is paid out from the stern of the barge which is not much above the water line and generally over a stinger which extends from the barge stern and supports the portion of the pipeline which initially enters the water. The pipeline processing equipment is normally enclosed by a structure which is again permanently attached to the hull's top side for protecting the equipment from the elements.

Although some smaller diameter pipeline may be wound onto a large spool or wheel and thereafter unreeled and laid at the pipelaying location from a barge, the laying of larger diameter pipeline such as pipeline over 12 inches in diameter is usually done by welding segments of 40 to 80 foot lengths of metal pipe together and passed over the stern to a stinger assembly as the pipeline is being constructed by the welding of the lengths together.

Beginning at the bow of the vessel, typical permanently attached pipeline processing equipment includes the following:

1. End facing units—The pipe joint ends are beveled as required by two or more end facing units. These units usually consist of a milling head and support devices to provide the necessary in-and-out travel of the cutting heads. The support apparatus is welded into the barge, but the end facing machines are portable.
2. Pipe joint conveyors—The conveyors are loaded by use of the vessel's cranes with pipe sections. The sections of pipe are then transferred over the conveyor to the line-up station. The conveyor holds several sections of pipe thereby providing a queue of sections to the line-up station. The conveyors are permanently welded to the vessel's work deck.
3. Pipe section line-up station—The line-up unit is used to align a new section of pipe to the pipe that has been welded or partially welded to the pipe string. The line-up units are permanently welded to the vessel's work deck, but the line-up clamps are portable. Controls for the line-up units are usually permanently installed.
4. Fixed roller station—Several multiple roller units, over which the pipeline travels during pipelaying operations, are permanently welded to the work deck of the barge.
5. Welding equipment—Usually several welding stations are provided along the line of the pipeline to make several welding passes. These stations consist of welding machines and work platforms. The work platforms are permanently built into the vessel's structure, but the welding machines are usually portable.
6. Radiographic stations—One or more radiographic units are used for non-destructive testing of the pipe joint welds before mastic is applied. The radiographic station includes shielding materials, such as lead sheathing or concrete, and radiographic units. The shielding materials are used to protect the barge personnel from the radiation hazard and are usually a permanent part of the vessel's structure. The radiographic units are normally portable, and are not usually retained on the vessel unless it is actively engaged in pipelaying operations.
7. Pipe tension machines—One or more tension machines are usually permanently installed directly on the work deck of the barge to provide linear hold-back tension on the pipeline. This hold-back tension is needed to prevent excessive bending stresses from occuring in the sag bend. The sag bend is that portion of the pipeline catenary that exists when the pipeline is laid on the ocean floor and the pipeline profile is changed from semi-vertical to horizontal. Controls for the tension machine are normally permanently installed in the barge's permanent structure. Hydraulic power units are permanently welded to the barge deck or installed permanently in the machinery deck of the barge.
8. Field joint station—One or more field joint stations are outfitted with equipment for crushing, melting, and distributing mastic or aggregate mixture on the non-coated sections of pipe, left bare, for the purpose of end to end joint welding. These stations require supports which are permanently welded into the barge structure.

Also near the bow of the vessel, near the pipe joint conveyors, there is provided an abandonment and recovery winch unit for laying down of the pipeline onto the ocean floor or picking up the pipeline after abandonment. The winch is usually diesel powered or hydraulically powered. For hydraulically powered winches, the power units are usually mounted on separate skits. The winch is usually permanently weld-mounted to the deck or below-decks in the machinery spaces. The power units, if required, are usually permanently mounted in the vessel structure.

Thus, a large part of the equipment necessary for pipeline processing and laying on conventional barges is mounted in such a manner as to preclude easy removal and transfer from the vessel. If this equipment could be removed from the barge during times when it is not being used for pipelaying, it would make available a large amount of valuable deck cargo space particularly for combination heavy lift/pipelaying barges. In addition, the permanent installation of such equipment precludes its utilization in a different vessel without costly removal processes.

SUMMARY OF THE INVENTION

The present invention solves the above problems in a straightforward manner. What is provided is a plurality of modules which may be removably attached to the deck of a barge. The modules may be attached to the deck by tack welding and are provided on at least one end with a closable opening for passing a pipeline portion therethrough to another module. Pipeline processing equipment placed in each module is thus easily moved with the module and also protected from the elements.

Accordingly, it is an object of the present invention to provide pipeline processing and laying equipment aboard a barge so that it may be easily removed therefrom and installed on another barge.

It is another object of the present invention to provide pipeline processing and laying equipment for a barge which is portable.

It is a further object of the present invention to provide such equipment which is protected from the elements while in use and during storage.

It is yet another object of the present invention to provide such equipment whereby easy passageway along in view of the pipelaying operations may be provided during use.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DETAILED DESCRIPTION OF THE PREFERRED EMBODIMENT

Figure 6:
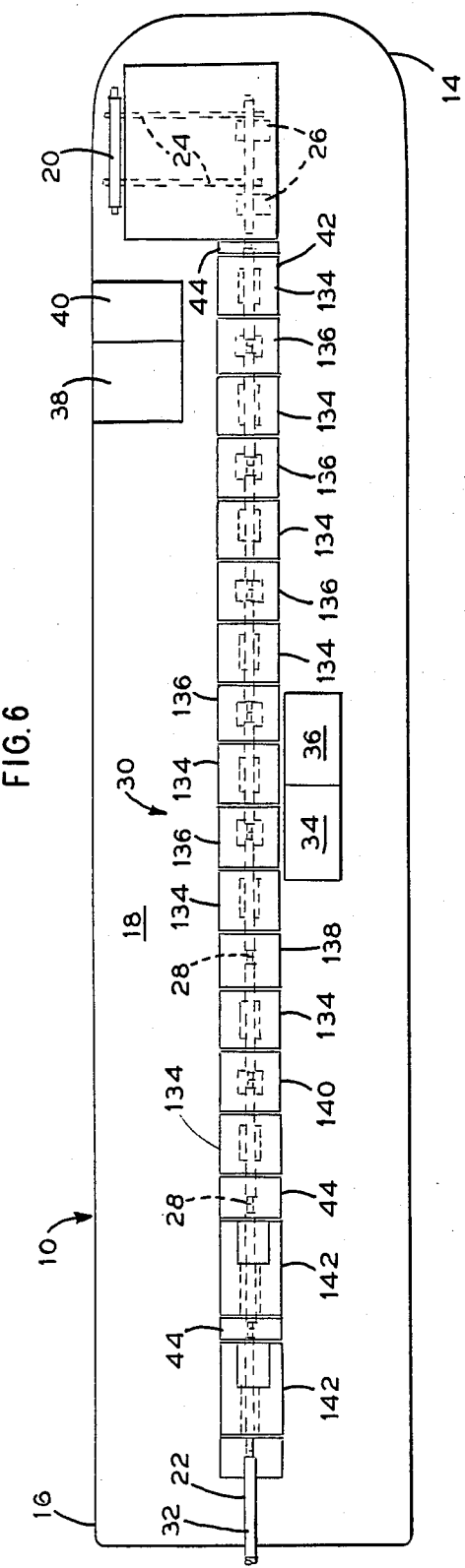
FIG. 6 is a schematic plan view of a barge in accordance with an alternative embodiment of the present invention.
Figure 7:
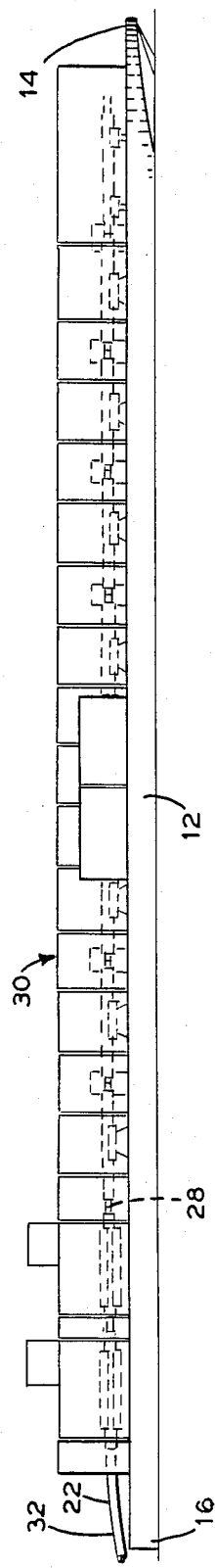
FIG. 7 is a side schematic view of the barge of FIG. 6.

Referring first to FIGS. 6 and 7, there is shown schematically a barge generally illustrated at 10 having a pair of sides or hulls 12, a bow portion 14, a stern portion 16, and a main or work deck 18. For the purpose of this specification and the claims, a "barge" is any craft which is capable of movement over a body of water either under its own power or by the use of tugs or other means of towing or pushing the craft.

Shown at 20 is a pipe section of perhaps 40 feet in length whose ends are welded to ends of other pipe sections and otherwise processed in a continuous process, one pipe section after another, to thus form a pipeline illustrated at 22 which is paid out from the stern of the barge and over a stinger (not shown) which extends from the barge stern as the pipeline is being formed and processed.

As the pipeline is being formed and processed, a pipe section is moved through a series of stations at each of which work is performed thereon. Initially, the pipe section travels along conveyors illustrated at 24 and passes by end facing units (not shown in FIGS. 6 and 7), then to a line-up station illustrated at 26 so that it may be aligned to the pipe that has already been welded or partially welded to the pipe string. As the pipe section is welded to an adjacent pipe section and is moved toward the stern of the barge to be laid out, it is moved through a series of processing stations housing pipeline processing equipment such as welding equipment, support units, radiographic equipment, pipe tensioning equipment, and equipment for applying mastic or aggregate mixture on the non-coated portions of pipe sections 28 at the joints which are welded, which pipeline processing equipment is schematically illustrated at 30. At 32 is shown a portion of pipeline on which all of the processing steps have been completed and which is being laid out over the stern of the barge, i.e., being laid on the ocean floor. Schematically illustrated at 34 and 36 are an air compressor unit and a generator unit respectively. Illustrated at 38 and 40 are a station for an abandonment and recovery winch and a power pack station respectively. Power pack station 40 may provide electrical or hydraulic power and may be portable or permanently contained in the barge.

It may be desirable at times to remove this pipeline processing equipment from the barge either to make additional room for valuable cargo space or so that it may be utilized in a different vessel, but it is desirable that costly removal processes not be involved or costly installation processes. In order to provide for easy removal of the pipeline processing equipment and easy installation on another barge, the pipeline processing equipment for each station is contained within a module such as that illustrated at 42. A plurality of such modules are shown in FIGS. 6 and 7 positioned on the main or work deck in end to end relation and removably attached to the deck by means such as tack welding. Each of the modules is preferably of such a size that it can be easily picked up by a crane of the barge or of another barge and removed therefrom after the tack welds are removed and after the modules are detached from adjacent modules as will be hereinafter described.

The modules containing pipe welding stations may be interchangeable with other modules containing pipe welding stations. A typical processing of a pipeline requires several such pipeline welding stations each of which makes one pass. In order to provide greater interchangeability of different size modules on different size barges, spacer modules such as that illustrated at 44 may also be provided. Such spacer modules do not contain any pipeline processing equipment but are provided to fill in the space between a couple of modules that do contain such equipment to prevent any of the pipeline processing equipment from being exposed to the elements during processing.

The pipeline processing equipment may be conventional equipment commonly known to those of ordinary skill in the art to which this invention pertains, and this equipment will therefore not be further described herein.

Figure 1:
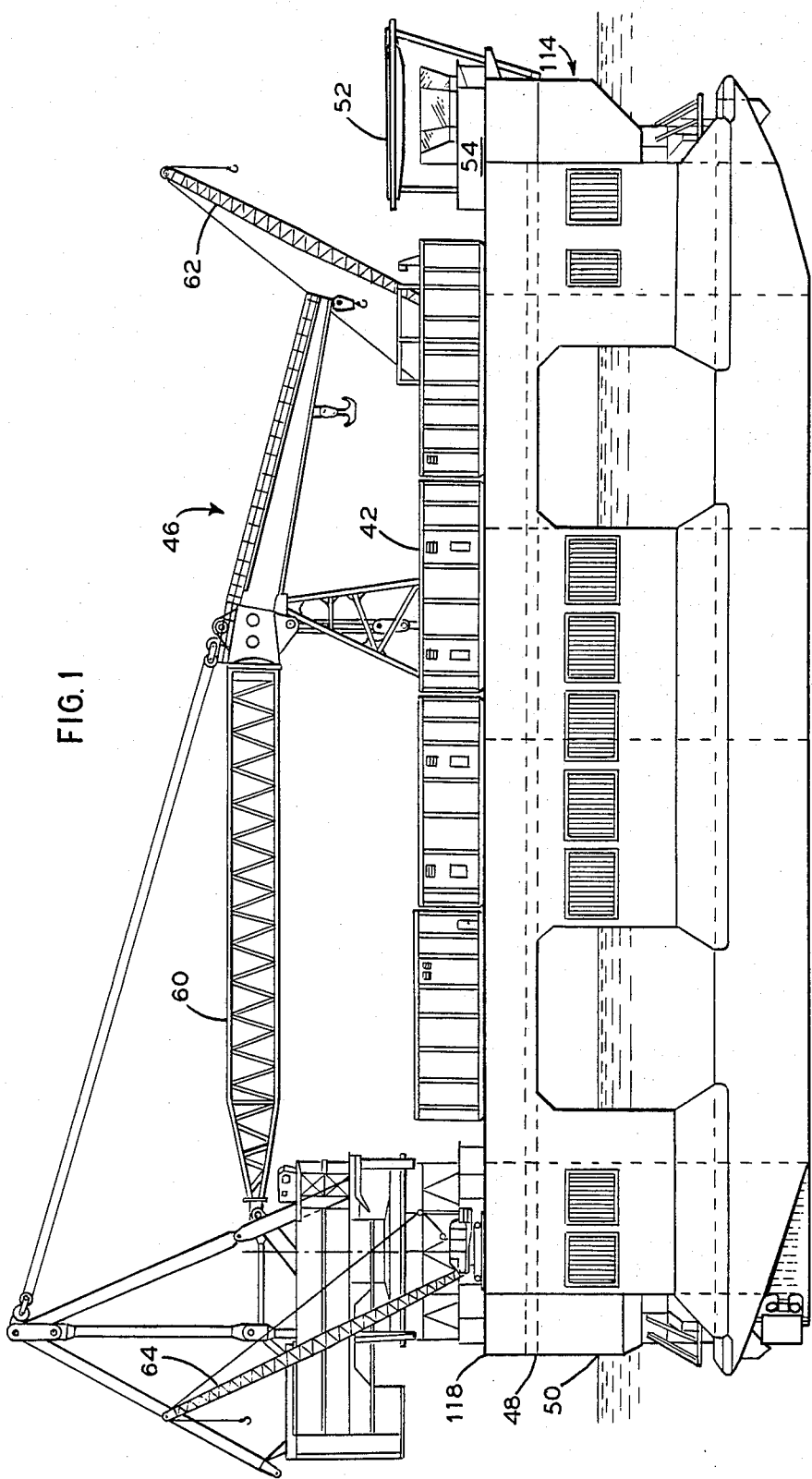
FIG. 1 is a side view of a barge embodying the present invention.
Figure 2:
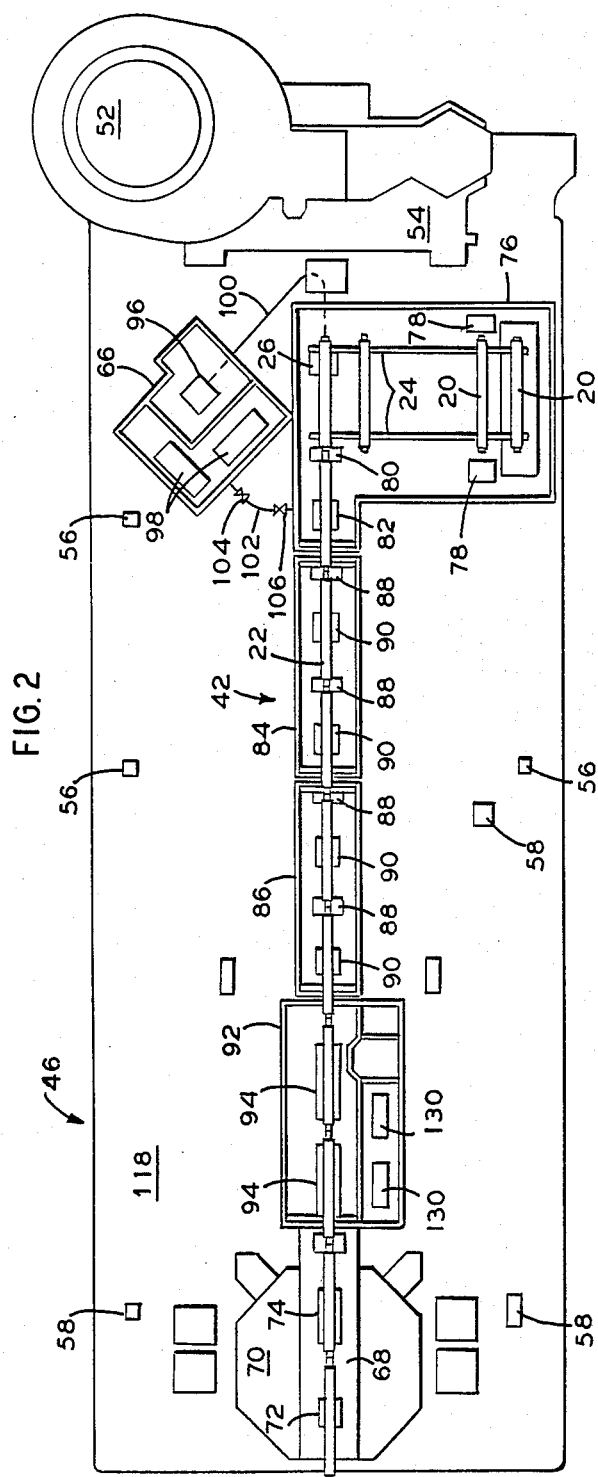
FIG. 2 is a plan view of the barge of FIG. 1.

Referring to FIGS. 1 and 2, there is shown a typical barge generally illustrated at 46 which may utilize modules illustrated at 42 embodying the present invention. This barge has a main or work deck 118, a freeboard deck illustrated at 48, and an operating draft shown at 50. The barge may typically have a length of 400–500 feet, a width of 160–170 feet, and a height of 131 feet.

The barge contains a heliport shown at 52, at the bow portion 114, a quarters building 54, supply wells 56, hatches 58, a derrick 60 which may be used for lifting the modules as well as other tasks, a couple of smaller cranes illustrated at 62 and 64, and various other equipment typically found on a pipe laying or derrick barge commonly known to those of ordinary skill in the art to which this invention pertains.

On barge 46 there are provided four modules containing pipeline processing equipment as well as an abandonment and recovery winch module illustrated at 66. Compared to some derrick barges which may have derricks of 1,000 to 5,000 ton capacities, and although the sizes and weights of the modules may vary, it is expected that typically a crane or derrick such as derrick 60 would require a minimum of 300 tons to lift the modules. Cranes 62 and 64 for lifting pipe and the like may typically have a capacity of 100 tons. If a derrick does not have sufficient reach to position certain modules at certain points on the deck or to remove modules from certain points, it may be necessary to jack modules along the deck so that they are in the derrick's reach or to jack them to their position from the derrick's reach. Alternatively, a barge carrying a derrick may be brought alongside of the barge to lift the modules.

Although the pipeline processing is shown in FIGS. 1 and 2 to be centered between the sides of the barge, it is not necessary to the present invention that it be so centered. Instead, the pipeline may be processed on one side or the other of the barge.

On derrick barges, the derrick is typically centered at the after end portion midway between the sides as shown in FIG. 2. In such a case, an opening illustrated at 68 may be provided in the derrick tub 70 below any rotating parts of the derrick for passage of the pipeline as it is being laid which opening may contain support rollers 72 and 74 and a field joint station for applying mastic or aggregate mixture on the non-coated sections of pipe left bare during welding. This equipment contained within the derrick tub opening may be permanently attached to the vessel.

With the modules in place as shown in FIG. 2, pipe sections 20 are lowered through an opening in the first module 76 onto conveyors 24 where they are conveyed by the end facing units 78 where the pipe joint ends are beveled and then to a line-up station 26 to the pipe that has been welded or partially welded to the pipe string 22. A welding machine as illustrated at 80 to provide an initial welding pass and a support roller is shown at 82. In the next two modules 84 and 86 are shown welding machines 88 and support rollers 90. In the fourth module 92 are shown a pair of tensioning machines 94 and a control house therefor. In the abandonment and recovery winch module 66 are a winch 96 and a pair of hydraulic power units 98 therefor. Shown schematically at 100 is a line for attaching to the end of a pipeline string for the purpose of lowering it to the ocean floor or for picking it up off of the ocean floor as the needs may arise. Although the modules are generally self-contained, since the hydraulic power packs for the abandonment and recovery winch are only used occasionally and generally not when it is necessary to use the hydraulic power packs for the first module, means may be provided for supplying hydraulic power from the hydraulic power packs and the abandonment and recovery winch module to the first module as illustrated by line 102 with valves at 104 and 106 sealing each of the modules at the entrance of line 102. A self-contained hydraulic system may also be permanently contained in the barge in the form of power pack station 40 as a ready source of hydraulic power. Electricity may of course be supplied to the modules from the barge's power source.

Figure 3:
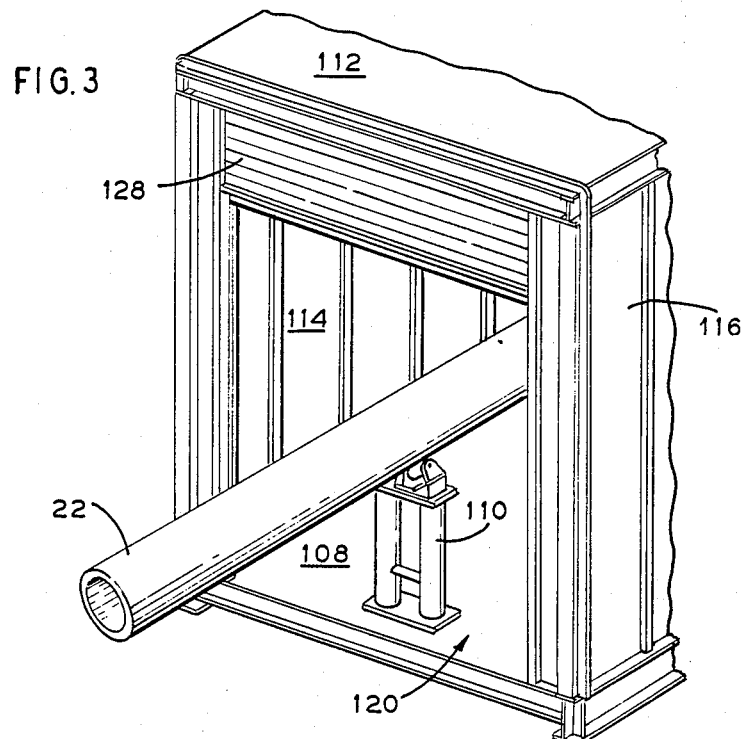
FIG. 3 is a perspective view of a portion of a module embodying the present invention with the module in use.

Referring to FIG. 3, there is shown a module which includes a floor 108 to which pipeline welding equipment such as support roller 110 is permanently attached, a ceiling 112, and a pair of side walls 114 and 116 which, as shown in FIGS. 1 and 2 extend longitudinally of the barge between the ends. The side walls 114 and 116 need not necessarily be totally enclosed, depending on the amount of protection desired. With the exception of the first module, each of the ends has an opening therein illustrated at 120 in FIG. 3 for the passage of a pipeline portion illustrated at 22. Although the ends may comprise walls through which a small opening is made for passage of a pipeline portion, in order to permit workers to walk between modules along the pipeline processing stations, and to view the length of the pipeline as it is being processed, it is preferred that the opening extend over substantially the entire width and height of the module as shown in FIG. 3.

Figure 5:
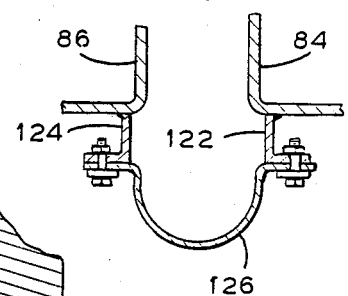
FIG. 5 is a sectional view illustrating the connection of two adjacent modules during use.

During pipeline processing and otherwise when the modules are positioned on a barge, it is desirable that the pipeline processing equipment be kept out of the elements and protected from the elements. Referring to FIG. 5, wherein a pair of modules such as 84 and 86 are illustrated adjacent to each other in end to end fashion, there are provided brackets 122 and 124 respectively extending along the walls and ceiling of each module at each end having an opening and an elastomeric member 126 extending between and attached to the brackets to seal the space between the adjacent modules from the elements and thus provide means for protecting the pipeline processing equipment from the elements while the modules are in position for use of the equipment. It is of course understood that other suitable means may be provided to achieve this objective.

Figure 4:
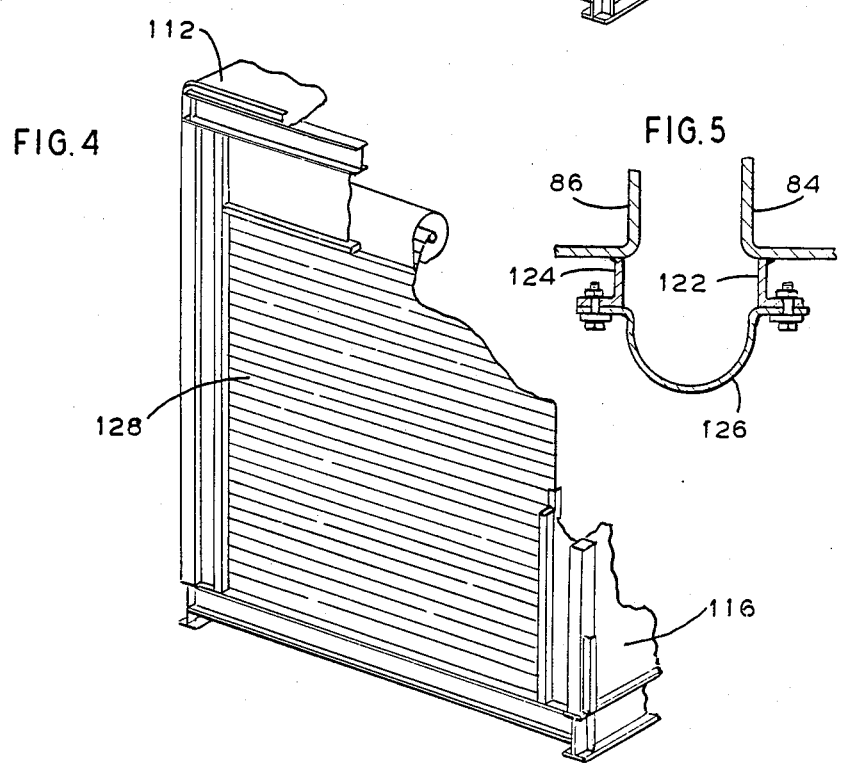
FIG. 4 is a view similar to FIG. 3 with the module not in use.

It is also desirable to protect the pipeline processing equipment as a module is being stored or moved to or from a barge. In order to provide such protection in accordance with the present invention, the openings 120 may be provided with roll-up doors 128, illustrated in the open position in FIG. 3 and in the closed position in FIG. 4, or other suitable means for closing the openings so that the interiors of the modules are sealed from the elements and the pipeline processing equipment is thus protected.

The sealing means between two adjacent modules may comprise a plurality of elastomeric strips 126 which extend between and along the ceilings and side walls of adjacent modules and which are attached to the ceilings and side walls such as by means of brackets which are attached thereto.

Therefore, in accordance with the present invention, there is provided a convertible barge wherein pipeline processing and laying equipment is readily and easily removable therefrom for storage or for positioning on another barge so that the convertible barge may be more efficiently utilized for other purposes. In order to convert a barge to a lay barge, in accordance with the present invention, a plurality of modules each of which has a floor 108, ceiling 112, and a pair of side walls 114 and 116 are positioned on a deck of the barge in end to end relation such that the floor, ceiling, and side walls extend longitudinally of the barge between the ends, pipeline process stations are provided in at least some of the modules, the modules are removably attached to the deck, and a closable opening is provided in at least one of the module ends of each module for passing a pipeline portion from the module to a respectively adjacent module as the pipeline is being processed.

It should be noted that since the abandonment and recovery winch module does not require any openings for passage of a pipeline portion, it is not included in the term "modules" as used in the claims.

The interiors of the modules are sealed from the weather and elements during use by preferably attaching a plurality of elastomeric strips between the walls and ceilings of adjacent modules.

If the openings in the ends were made only large enough for the pipeline to pass through, then of course it would be desirable to provide doors in each of the modules for workers to enter them.

Both welding station modules and support roller modules may be interchangeable.

The fourth module 92 containing the tensioning machines is also provided with one or more self-contained hydraulic power units 130.

The line from the abandonment recovery winch may contain typically a three-inch diameter cable. Beginning with the pipe conveyor and line-up module 132 in FIG. 6, the modules progressing toward the stern portion of the vessel may include a spacer module 44, fixed roller module 134, weld station module 136, fixed roller module 134, weld station module 136, fixed roller module 134, weld station module 136, fixed roller module 134, weld station 136, fixed roller module 134, x-ray module 138, fixed roller module 134, repair module 140, fixed roller module 134, spacer module 44, tensioner module 142, spacer module 44, tensioner module 142, and field joint module 144 where mastic is applied. Though not illustrated in FIG. 2, field joint module 144 may be positioned in opening 68 of derrick tub 70 or aft of derrick tub 70 forward of the stinger. It should be understood that the above naming of modules by the equipment housed therein is not intended to imply that each module is designed to house only one type of equipment. The modules are designed to house a variety of equipment, as seen in FIG. 2, and are given specific names above only as a matter of convenience in depicting a common arrangement of equipment on pipelay barges.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A convertible barge, comprising:
   a. a deck;
   b. a plurality of modules positioned on said deck in end to end relation and at least some of which contain pipeline processing equipment, said modules being removably attached to said deck, each said module comprising a floor, ceiling, and a pair of side walls extending longitudinally of the barge between the ends; and
   c. means defining a closable opening comprising a roll-up door in at least one end of said modules for passing a pipeline portion from said module to a respectively adjacent module as the pipeline is being processed, for sealing the module during storage and for providing passageways between the modules and a view of pipe laying operations during use.

2. A barge according to claim 1 wherein said modules are attached to said deck by tack welding.

3. A barge according to claim 1, further comprising means for sealing the interiors of the modules from the weather during use.

4. A barge according to claim 3 wherein said sealing means comprises a plurality of elastomeric strips which extend between and along the ceilings and sidewalls of adjacent modules and are attached to the ceilings and sidewalls.

5. A barge according to claim 1 wherein said modules include at least one spacer module positionable between modules which house pipeline process stations whereby modules of standardized dimensions may be used for housing pipeline process stations.

6. A barge according to claim 1, further comprising a self-contained hydraulic system permanently contained in said barge.

7. A barge according to claim 1, wherein at least one of said modules includes a self-contained hydraulic system.

8. A lay barge according to claim 7 wherein said at least two of said modules includes a pipe rack conveyor module and an abandonment and recovery winch module.

9. A barge according to claim 1, further comprising means defining hydraulic openings in each of at least two of said modules and valve means to open and close the openings to provide hydraulic service to said at least two of said modules from a single hydraulic power supply means.

10. A barge according to claim 1, further comprising a derrick means on the barge having a capacity to lift each of said modules.

11. A barge according to claim 1, further comprising an abandonment and recovery winch module which includes at least one hydraulic power means, and closable means for supplying hydraulic power to one of said other modules.

12. A method for converting a barge to a lay barge, comprising:
   a. positioning on a deck of the barge in end to end relation of plurality of modules each of which has a floor, ceiling, and a pair of sidewalls extending longitudinally of the barge between the ends;
   b. providing pipeline process stations in at least some of the modules;
   c. removably attaching the modules to the deck; and
   d. providing a roll-up door in at least one of the module ends of each module for passing a pipeline portion from the module to a respectively adjacent module as the pipeline is being processed and for providing passageways between the modules and a view of pipe laying operations during use.

13. A method according to claim 12 wherein the step of attaching the modules to the deck includes tack welding the modules to the deck.

14. A method according to claim 12, further comprising sealing the interiors of the modules from the weather.

15. A method according to claim 14 wherein said step of sealing the modules from the weather comprises attaching a plurality of elastomeric strips between and along the ceilings and side walls of adjacent modules.

16. A method according to claim 12, further comprising positioning at least one spacer module between modules which house pipeline processing stations whereby modules of standardized dimensions may be used for housing pipeline processing stations.

17. A method according to claim 12, further comprising positioning a crane on the barge having a capacity sufficient to lift each of the modules.

18. A method according to claim 12, further comprising the step of positioning on the barge deck on abandonment and recovery winch module which includes a hydraulic power pack and means for supplying hydraulic power to at least one of the other modules.

* * * * *